(12) United States Patent
Gong

(10) Patent No.: US 9,581,790 B2
(45) Date of Patent: Feb. 28, 2017

(54) MOBILE PHONE LENS

(71) Applicant: Union Optech Co., Ltd., Zhongshan (CN)

(72) Inventor: Junqiang Gong, Zhongshan (CN)

(73) Assignee: UNION OPTECH CO., LTD., Zhongshan (CN)

( * ) Notice: Subject to any disclaimer, the term of this patent is extended or adjusted under 35 U.S.C. 154(b) by 0 days.

(21) Appl. No.: 14/751,169

(22) Filed: Jun. 26, 2015

(65) Prior Publication Data

US 2016/0195698 A1    Jul. 7, 2016

(30) Foreign Application Priority Data

Jan. 4, 2015    (CN) .......................... 2015 1 0005146

(51) Int. Cl.
*G02B 13/00*    (2006.01)
*G02B 9/62*    (2006.01)
*G02B 13/18*    (2006.01)
*G02B 3/02*    (2006.01)

(52) U.S. Cl.
CPC ................. *G02B 13/0045* (2013.01)

(58) Field of Classification Search
CPC ........ G02B 23/243; G02B 9/62; G02B 13/00; G02B 15/177; G02B 27/646; G02B 13/02; G02B 15/173; G02B 21/365; G02B 7/08; G02B 9/24; G02B 15/22; G02B 13/0045
USPC ........ 359/713, 756, 757, 759, 682, 684, 689
See application file for complete search history.

(56) References Cited

U.S. PATENT DOCUMENTS

2010/0142058 A1*  6/2010  Takato ................. G02B 23/243
                                                                    359/661

* cited by examiner

*Primary Examiner* — Alicia M Harrington
(74) *Attorney, Agent, or Firm* — Matthias Scholl, PC; Matthias Scholl

(57) ABSTRACT

A mobile phone lens, including in the direction from an object being imaged to an imaging plane: a first lens group, a diaphragm, a second lens group, a third lens group, and a filter. The first lens group and the third lens group are stationary. The second lens group is adapted to move along an optical axis. The first lens group includes a first lens. The second lens group includes in the direction from the object being imaged to the imaging plane: a second lens, a third lens, and a fourth lens. The third lens group includes in the direction from the object being imaged to the imaging plane: a fifth lens, and a six lens.

5 Claims, 2 Drawing Sheets

MOBILE PHONE LENS

CROSS-REFERENCE TO RELATED APPLICATIONS

Pursuant to 35 U.S.C. §119 and the Paris Convention Treaty, this application claims the benefit of Chinese Patent Application No. 201510005146.X filed Jan. 4, 2015, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a mobile phone lens.

Description of the Related Art

Typically, a mobile phone lens has a small imaging plane and no internal focusing, the brightness of the imaging plane is non-uniform, and a clear image can be obtained only at a fixed object distance.

SUMMARY OF THE INVENTION

In view of the above-described problems, it is one objective of the invention to provide a mobile phone lens that features internal focusing, large imaging plane and high luminance.

To achieve the above objective, in accordance with one embodiment of the invention, there is provided a mobile phone lens, comprising: from an object being imaged to an imaging plane, a first lens group, a diaphragm, a second lens group, a third lens group, and a filter; wherein the first lens group and the third lens group are stationary; the second lens group is adapted to move along an optical axis; the first lens group comprises a first lens; the second lens group comprises, from the object being imaged to the imaging plane, a second lens, a third lens, and a fourth lens; the third lens group comprises, from the object being imaged to the imaging plane, a fifth lens, and a six lens.

In a class of this embodiment, focal powers of the first lens, the second lens, the fourth lens and the fifth lens are positive, and focal powers of the third lens and the sixth lens are negative.

In a class of this embodiment, the first lens, the second lens, the fourth lens and the fifth lens are meniscus aspheric lenses; the third lens is a biconcave aspheric lens; and the sixth lens is a bi-recurvate aspheric lens.

In a class of this embodiment, an image side of the first lens is concave inwards, and an object side of the fifth lens is concave inwards.

In a class of this embodiment, the first lens, the third lens, the fourth lens and the sixth lens are plastic, and the second lens and the fifth lens are glass.

In a class of this embodiment, aspheric surfaces of the first lens, the second lens, the third lens, the fourth lens, the fifth lens, and the sixth lens meet the following formula:

$$Z = \frac{cy^2}{1 + \sqrt{1 - (1+k)c^2 y^2}} + a_1 y^2 + a_2 y^4 + a_3 y^6 + a_4 y^8 + a_5 y^{10} + a_6 y^{12} + a_7 y^{14} + a_8 y^{16}$$

c represents a curvature corresponding to a radius, y represents a radial coordinate, k represents a conic coefficient of a cone, $a_1$-$a_8$ represent coefficients corresponding to different radial coordinates.

Advantages according to embodiments of the invention are summarized as follows:

1. The lens of conventional mobile phone lenses is stationary, and only in a specific object distance can a clear image be obtained. The mobile phone lens of the invention adopts the internal focusing mode, no matter how the object distance varies, for example, even the object distance is 0.08 meter, the formed image is still clear.

2. The imaging plane of conventional mobile phone lenses is very small, in general, it is about ¼". Although the resolution of the lens is rather high, the imaging quality is poor. The invention adopts 1/2.3" imaging plane, and the resolution of the lens is much higher, so the imaging quality is good.

3. The luminance of conventional mobile phone lens is rather low, the brightness difference between the center and periphery of the image is large. The invention optimizes the luminance and improves the peripheral luminance so that the luminance of the center and periphery of the image is basically uniform.

4. The pixel of convention mobile phone lens is low and can only meet the daily photo taking. The mobile phone lens of the invention adopts a large imaging plane for image formation, with high resolution, and the obtained image is real and clear. More importantly, even in a very small object distance, the image is still clear.

5. The material of the mobile phone lens is a mixture of plastic and glass, which is easy to process thereby improving the yield of qualified products.

BRIEF DESCRIPTION OF THE DRAWINGS

The invention is described hereinbelow with reference to accompanying drawings, in which.

Figure 1:
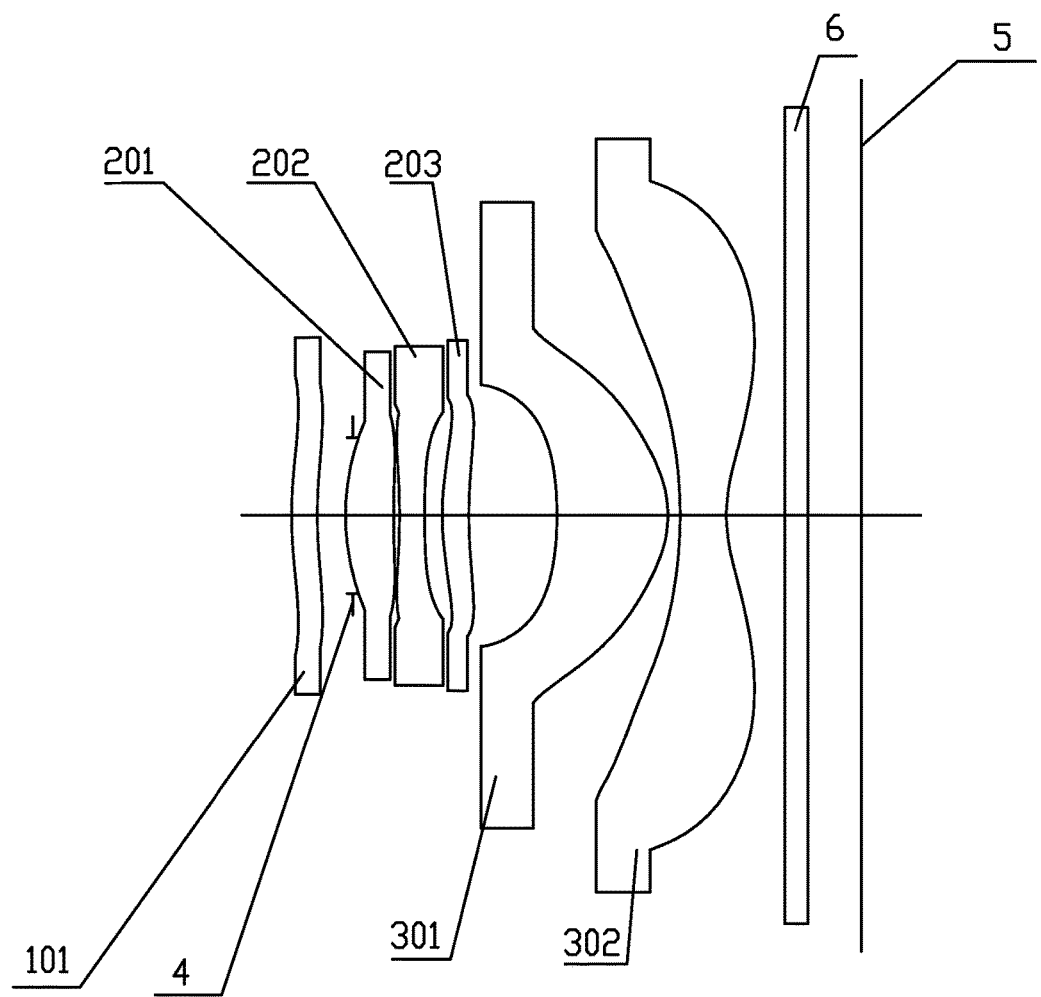
FIG. 1 is a schematic diagram of an optical system according to one embodiment of the invention.

In the drawing, the following reference numbers are used: 101. First lens; 201. Second lens; 202. Third lens; 203. Fourth lens; 301. Fifth lens; 302. Sixth lens; 4. Diaphragm; 5. Imaging plane; 6. Filter.

DETAILED DESCRIPTION OF THE EMBODIMENTS

For further illustrating the invention, experiments detailing a mobile phone lens are described below. It should be noted that the following examples are intended to describe and not to limit the invention.

Figure 2:
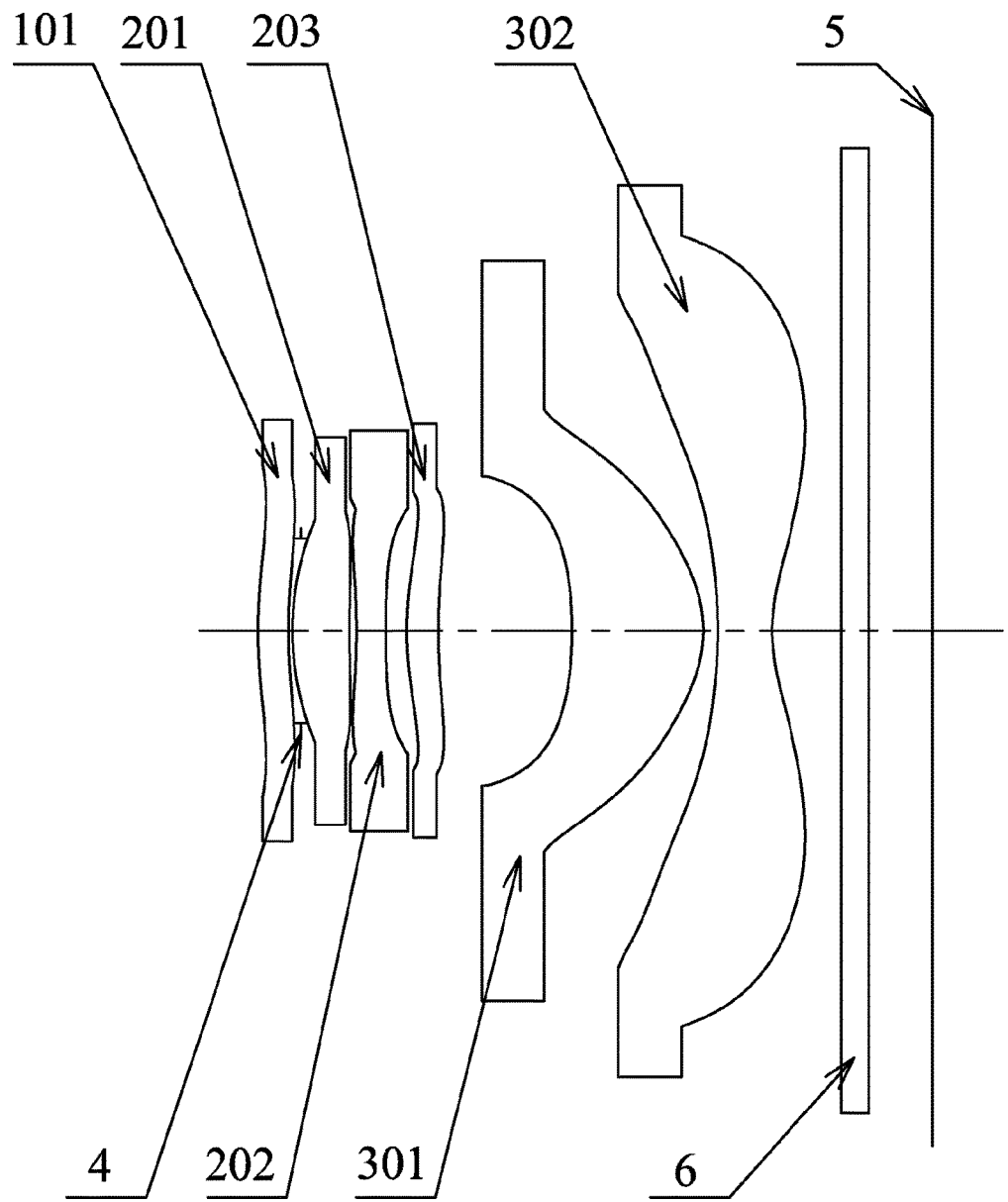
FIG. 2 is another schematic diagram of an optical system according to one embodiment of the invention.

As shown in FIGS. 1 and 2, a mobile phone lens comprises: from an object being imaged to an imaging plane 5, a first lens group, a diaphragm 4, a second lens group, a third lens group, and a filter 6. The first lens group and the third lens group are stationary; the second lens group is adapted to move along an optical axis. The first lens group comprises a first lens 101; the second lens group comprises, from the object being imaged to the imaging plane 5, a second lens 201, a third lens 202, and a fourth lens 203; the third lens group comprises, from the object being imaged to the imaging plane 5, a fifth lens 301, and a six lens 302.

The focal powers of the first lens 101, the second lens 201, the fourth lens 203 and the fifth lens 301 are positive, and the focal powers of the third lens 202 and the sixth lens 302 are negative. The first lens 101, the second lens 201, the fourth lens 203 and the fifth lens 301 are meniscus aspheric lenses; the third lens 202 is a biconcave aspheric lens; and the sixth lens 302 is a bi-recurvate aspheric lens. The image side of the first lens 101 is concave inwards, and the object side of the fifth lens 301 is concave inwards.

To achieve internal focusing, the second lens group is designed as being movable. When the object distance varies, the second lens group moves a certain distance to compensate the variation of the back focus, so that the focusing can always be projected on the imaging plane 5 to form a clear image. In addition, during designing, the second lens group is provided with enough shifting distance, so that when the mismachining tolerance unexpectedly occurs, the focusing can still be accurate.

To achieve a large imaging plane, the fifth lens 301 employs a meniscus aspheric lens, and the object side thereof is concave inwards, so that the field curvature resulting from the movement of the second lens group can be effectively corrected, thereby rapidly smoothly raising the light ray. In addition, the fifth lens 301 is made of high refractive index and low dispersion coefficient material, which can correct the color distortion well. The sixth lens 302 is an M-shaped bi-recurvate aspheric lens, which can control the light rays from different optical fields to enter the imaging plane in small angles, improve the peripheral luminance of the imaging plane, correct the comatic aberration of the surrounding optical fields, and improve the imaging quality with large imaging plane and without degrading the imaging quality.

To achieve high luminance, the lenses are made of mixed material of plastic and glass, which solves the problem of low light permeability of a pure plastic structure. The movable lens group is disposed behind the diaphragm, which ensures the light rays project on the surface of the lenses with a large angle, reduces the reflection of the light rays on the surface of the lenses, and improves the energy utilization.

When designing the mobile phone lens, broad spectrum is taken into account, and the designed theoretical resolution is far higher than an actual demand value, thereby ensuring the image acuteness and the color restoration.

The following is a specific example of a mobile phone lens. Table 1 lists the parameters of the lens of the mobile phone.

TABLE 1

| No. | Surface shape | Radius | Thickness | Material | Effective aperture |
|---|---|---|---|---|---|
| OBJ | Object side | Infinity | Infinity | — | Infinity |
| A | aspheric | 2.3657 | 0.2925 | SP-1516 | 1.3679 |
| B | aspheric | 4.1185 | 0.2357 | — | 1.1852 |
| STO | Standard | Infinity | 0.002 | — | 0.8015 |
| C | aspheric | 2.1173 | 0.4355 | M-BACD15 | 0.8137 |
| D | aspheric | 9.2856 | 0.0503 | — | 0.9038 |
| E | aspheric | −4.883 | 0.3016 | OKP-850 | 0.9622 |
| F | aspheric | 6.8743 | 0.1352 | — | 0.9854 |
| G | aspheric | 3.6627 | 0.2618 | F52R | 1.0583 |
| H | aspheric | 4.8216 | 0.8753 | — | 1.1329 |
| I | aspheric | −4.6128 | 0.7753 | M-LAC8 | 1.2279 |
| J | aspheric | −0.9935 | 0.1022 | — | 1.6853 |
| K | aspheric | −3.5768 | 0.5219 | APL5014CL | 2.8219 |
| L | aspheric | 1.3587 | 0.35 | — | 3.2247 |
| M | Standard | Infinity | 0.21 | H-K9L | 3.5546 |
| N | Standard | Infinity | 0.8 | — | 3.5829 |
| IMA | Image side | Infinity | — | — | 3.98 |

In Table 1, A represents an object side of the first lens, B represents an image side of the first lens; C represents an object side of the second lens, D represents an image side of the second lens; E represents an object side of the third lens, F represents an image side of the third lens; G represents an object side of the fourth lens, H represents an image side of the fourth lens; I represents an object side of the fifth lens, J represents an image side of the fifth lens; K represents an object side of the sixth lens, L represents an image side of the sixth lens; OBJ represents the surface of an object being imaged; STO represents a diaphragm; M represents an object side of the filter, N represents an image side of the filter; IMA represents the surface of a clear image. And the unit of the numbers in Table 1 is millimeter.

The range of movement of the lens is as follows

The space between the first lens group and the second lens group is between 0.2375 mm and 0.0632 mm.

The space between the second lens group and the third lens group is between 0.7753 mm and 0.9478 mm.

The aspheric surfaces of the first lens, the second lens, the third lens, the fourth lens, the fifth lens, and the sixth lens meet the following formula:

$$Z = \frac{cy^2}{1 + \sqrt{1 - (1+k)c^2 y^2}} + a_1 y^2 + a_2 y^4 + a_3 y^6 + a_4 y^8 + a_5 y^{10} + a_6 y^{12} + a_7 y^{14} + a_8 y^{16}$$

c represents a curvature corresponding to a radius, y represents a radial coordinate a unit of which is the same as that of the lens length, k represents a conic coefficient of a cone. Specifically, when k is less than −1, the surface shape is a hyperbola; when k is equal to −1, the surface shape is a parabola; when k is greater than −1 and less than 0, the surface shape is an ellipse; when k is equal to 0, the surface shape is a circle. $a_1$-$a_8$ represent coefficients corresponding to different radial coordinates. Based on the parameters, the shape and dimensions of the two aspheric surfaces of the lenses can be accurately determined.

Table 2 lists the aspheric parameters of lenses of the invention.

TABLE 2

| | Side A of the first lens | Side B of the first lens |
|---|---|---|
| K | −12.68543 | −18.22597 |
| $a_2$ | −0.030295 | −0.035298 |
| $a_3$ | −0.006584 | −0.011287 |
| $a_4$ | −0.0029522 | −0.0035498 |
| $a_5$ | 0.0132965 | 0.0232518 |
| $a_6$ | 0.0044298 | −0.0087525 |
| $a_7$ | −0.0062113 | −0.0077356 |
| $a_8$ | 0.0019781 | 0.0044372 |

| | Side C of the second lens | Side D of the second lens |
|---|---|---|
| K | 0.65376 | 89.77591 |
| $a_2$ | −0.0065539 | −0.053226 |
| $a_3$ | −0.0195713 | −0.0123221 |
| $a_4$ | 0.0018504 | 0.0142581 |
| $a_5$ | −0.0002012 | −0.055392 |
| $a_6$ | −0.0522341 | −0.0487716 |
| $a_7$ | 0.0165501 | 0.153352 |
| $a_8$ | −0.009835 | −0.094641 |

| | Side E of the third lens | Side F of the third lens |
|---|---|---|
| K | 1.22588 | −2.88396 |
| $a_2$ | 0.006817 | −0.0285543 |

TABLE 2-continued

|  | | |
|---|---|---|
| $a_3$ | 0.193524 | 0.372514 |
| $a_4$ | −0.204952 | −0.652219 |
| $a_5$ | −0.069831 | 0.385534 |
| $a_6$ | 0.2118851 | 0.078661 |
| $a_7$ | 0.0122814 | −0.221056 |
| $a_8$ | −0.071586 | 0.083297 |

|  | Side G of the fourth lens | Side H of the fourth lens |
|---|---|---|
| K | −20.22197 | 6.58493 |
| $a_2$ | 0.0384421 | −0.065318 |
| $a_3$ | −0.152876 | −0.033281 |
| $a_4$ | 0.236045 | 0.032694 |
| $a_5$ | −0.322161 | −0.021831 |
| $a_6$ | 0.261176 | −0.048779 |
| $a_7$ | −0.143315 | 0.066514 |
| $a_8$ | 0.028642 | −0.008634 |

|  | Side I of the fifth lens | Side J of the fifth lens |
|---|---|---|
| K | 3.22158 | −2.19263 |
| $a_2$ | −0.048672 | −0.101967 |
| $a_3$ | −0.003512 | 0.0418425 |
| $a_4$ | 0.0292961 | −0.012384 |
| $a_5$ | −0.005753 | −8.524E-004 |
| $a_6$ | −0.002967 | 5.332E-004 |
| $a_7$ | 0.062135 | 3.216E-004 |
| $a_8$ | −0.0331746 | −6.891E-005 |

|  | Side K of the sixth lens | Side L of the sixth lens |
|---|---|---|
| K | −28.2976 | −8.825155 |
| $a_2$ | −0.029461 | −0.033296 |
| $a_3$ | 0.005469 | 0.008217 |
| $a_4$ | 0.0022173 | −0.0022195 |
| $a_5$ | −5.285E-004 | 2.262E-004 |
| $a_6$ | 7.672E-005 | −2.841E-006 |
| $a_7$ | −2.964E-006 | −6.894E-008 |
| $a_8$ | 2.198E-007 | −2.587E-009 |

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A mobile phone lens, comprising in the direction from an object being imaged to an imaging plane:
    a) a first lens group;
    b) a diaphragm;
    c) a second lens group;
    d) a third lens group; and
    e) a filter;
wherein:
    the first lens group and the third lens group are stationary;
    the second lens group is adapted to move along an optical axis;
    the first lens group comprises a first lens;
    the second lens group comprises, in the direction from the object being imaged to the imaging plane, a second lens, a third lens, and a fourth lens;
    the third lens group comprises, in the direction from the object being imaged to the imaging plane, a fifth lens, and a six lens; and
    focal powers of the first lens, the second lens, the fourth lens and the fifth lens are positive, and focal powers of the third lens and the sixth lens are negative.

2. The mobile phone lens of claim 1, wherein the first lens, the second lens, the fourth lens and the fifth lens are meniscus aspheric lenses; the third lens is a biconcave aspheric lens; and the sixth lens is a bi-recurvate aspheric lens.

3. The mobile phone lens of claim 2, wherein aspheric surfaces of the first lens, the second lens, the third lens, the fourth lens, the fifth lens, and the sixth lens meet the following formula:

$$Z = \frac{cy^2}{1+\sqrt{1-(1+k)c^2 y^2}} + a_1 y^2 + a_2 y^4 + a_3 y^6 + a_4 y^8 + a_5 y^{10} + a_6 y^{12} + a_7 y^{14} + a_8 y^{16},$$

where
    c represents a curvature corresponding to a radius,
    y represents a radial coordinate,
    k represents a conic coefficient of a cone, and
    $a_1$-$a_8$ represent coefficients corresponding to different radial coordinates.

4. The mobile phone lens of claim 1, wherein an image side of the first lens is concave inwards, and an object side of the fifth lens is concave inwards.

5. The mobile phone lens of claim 1, wherein the first lens, the third lens, the fourth lens and the sixth lens are plastic, and the second lens and the fifth lens are glass.

* * * * *